US012786753B2

(12) United States Patent
Murthy et al.

(10) Patent No.: US 12,786,753 B2
(45) Date of Patent: Nov. 3, 2026

(54) FLOW-BASED QUALITY OF EXPERIENCE AS A SERVICE

(71) Applicant: HEWLETT PACKARD ENTERPRISE DEVELOPMENT LP, Spring, TX (US)

(72) Inventors: Karthik Srinivasa Murthy, Santa Clara, CA (US); Sachin Ganu, San Jose, CA (US); Rajarshi Bhattacharyya, Santa Clara, CA (US); Parag Dedhia, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 293 days.

(21) Appl. No.: 18/811,117

(22) Filed: Aug. 21, 2024

(65) Prior Publication Data

US 2026/0059346 A1 Feb. 26, 2026

(51) Int. Cl.

| | |
|---|---|
| ***H04L 12/00*** | (2006.01) |
| ***H04L 43/0817*** | (2022.01) |
| ***H04W 24/02*** | (2009.01) |
| ***H04W 24/08*** | (2009.01) |

(52) U.S. Cl.

CPC ......... *H04W 24/02* (2013.01); *H04L 43/0817* (2013.01); *H04W 24/08* (2013.01)

(58) Field of Classification Search

CPC . H04W 24/02; H04W 24/08; H04W 28/0273; H04W 28/10; H04W 28/24; H04L 43/0817

USPC .......................................................... 370/252

See application file for complete search history.

(56) References Cited

U.S. PATENT DOCUMENTS

| | | | | |
|---|---|---|---|---|
| 2014/0169788 | A1* | 6/2014 | Hussain | H04L 12/00 398/43 |
| 2018/0083685 | A1* | 3/2018 | Patwardhan | H04B 7/0626 |
| 2022/0150183 | A1* | 5/2022 | Clancy | H04L 47/2441 |
| 2022/0200899 | A1* | 6/2022 | Nagarajan | H04L 45/38 |
| 2025/0080469 | A1* | 3/2025 | Smith | H04L 47/2441 |
| 2025/0220548 | A1* | 7/2025 | Tran | H04W 76/12 |
| 2025/0274395 | A1* | 8/2025 | Huang | H04W 52/02 |
| 2025/0337690 | A1* | 10/2025 | Murthy | H04L 47/2433 |

* cited by examiner

*Primary Examiner* — Frantz Coby
(74) *Attorney, Agent, or Firm* — Dickinson Wright

(57) ABSTRACT

Systems and methods are provided for receiving telemetry data and computing a client quality of experience (QoE) score for each traffic flow associated with a client from the received telemetry data. Performance data for each traffic flow is aggregated to arrive at an overall radio availability score, which can then be used to identify a list of recommended target radios that are more likely to service the client with better QoE than the radio to which the client is currently associated. Depending on certain considerations, e.g., whether a client has recently been steered to a new radio(s), or if steering is imminent, the recommended list of target radios are filtered to arrive at a subset of the recommended list identifying the most preferred target radios to which clients can be steered. Steering recommendations can be generated based on the recommended list.

20 Claims, 7 Drawing Sheets

FLOW-BASED QUALITY OF EXPERIENCE AS A SERVICE

BACKGROUND

Multiple, different transmission protocols can be used to effectuate Wi-Fi transmissions. Examples of such transmission protocols include, e.g., OFDMA (Orthogonal Frequency-Division Multiple Access), which may be used to support low latency operations, and MU-MIMO (Multi-User Multiple-Input and Multiple-Output), which may be used to support high data throughput operations.

The IEEE 802.11 ax standard, also referred to as Wi-Fi 6, provides support for both OFDMA and MU-MIMO modes of operation in the uplink and downlink directions. These alternative modes allow for flexibility in supporting varying operations as applications requiring low latency and operations requiring high data throughput will be supported by a particular access point (AP) that is operating under IEEE 802.11 ax.

BRIEF DESCRIPTION OF THE DRAWINGS

Examples of the presently disclosed technology are described in detail with reference to the following figures. The figures are provided for purposes of illustration only and merely depict typical or example aspects of the presently disclosed technology.

Figure 1:
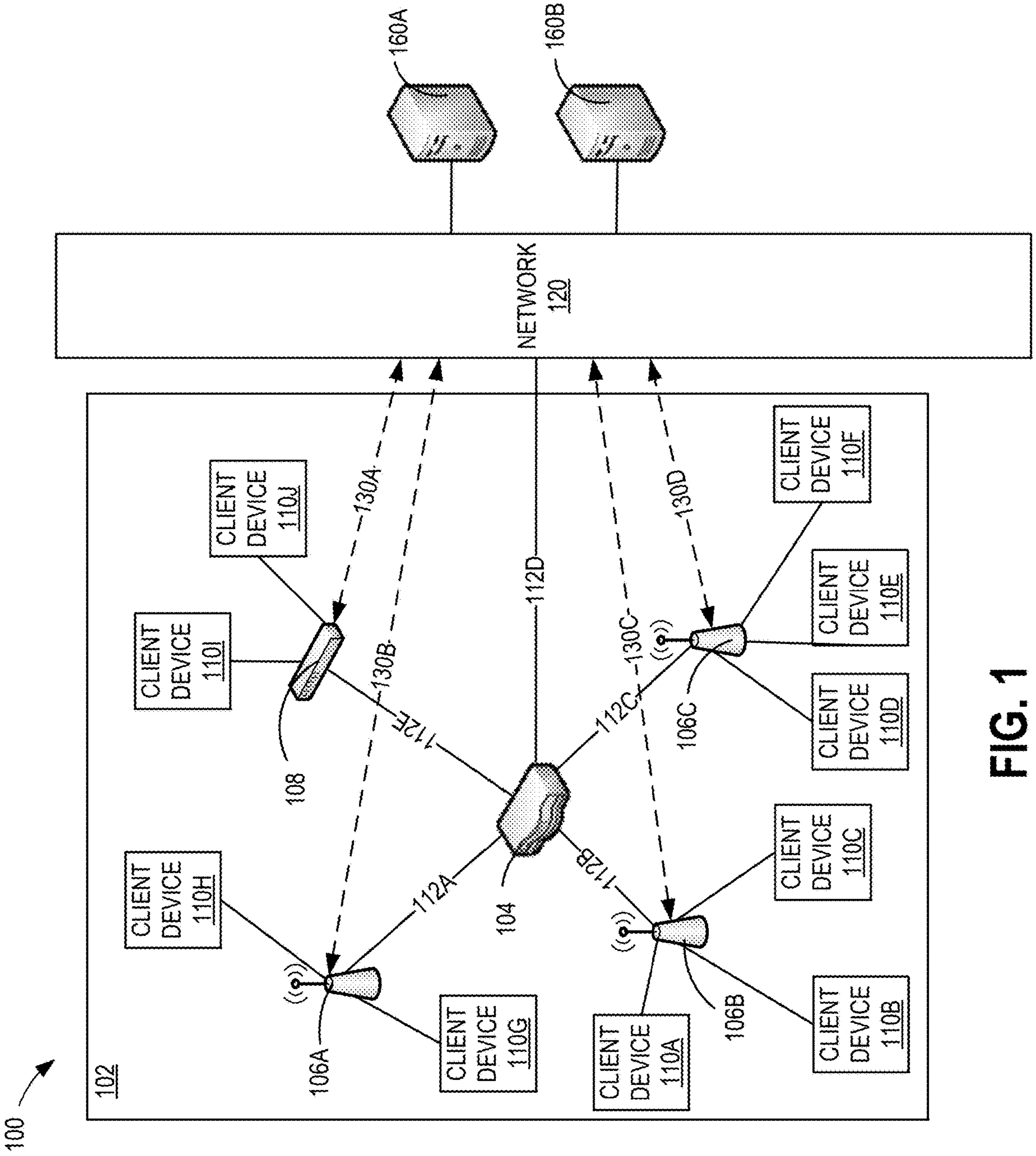
FIG. 1 illustrates one example of a network configuration that may be implemented for an organization, such as a business, educational institution, governmental entity, healthcare facility or other organization, and in which client orchestration may be implemented in accordance with examples of the presently disclosed technology.

The figures are not exhaustive and do not limit the present disclosure to the precise form disclosed.

DETAILED DESCRIPTION

Examples of the presently disclosed technology provide a service, such as a cloud-based service, that may perform intelligent client orchestration/control client mobility based on client health and neighboring radio availability scores. Client health can be characterized by received signal strength identifier (RSSI) values and Quality of Experience (QoE) scores across traffic flows associated with the client/ client device. Examples according to the presently disclosed technology provide QoE radio-client matches and radio-client recommendations based on the QoE radio-matches for Wi-Fi clients in a network. The radio-client matches and recommendations can be used to segregate or de-prioritize non-critical application traffic (e.g., background traffic) from critical application traffic (e.g., voice traffic). The radio-client matches and recommendations may also be used to load balance critical traffic flows depending on existing channel conditions. Such segregation and load balancing can be achieved by dynamically steering client associations with radios, which in turn results in the desired prioritization of business-critical and low-latency applications traffic.

QoE, which is distinct from Quality of Service (QoS), focuses on the experience at end-user devices and parameters impacting the end-user experience. QoE is a measure of the delight or annoyance of an end-user's experience with a service (e.g., web browsing, phone call, TV broadcast), in other words, an end-user's response to performance of a service. Additionally, while QoE focuses on the entire service experience, QoS is a description or measurement of the overall performance of a service that focuses on network infrastructure and operating parameters affecting transmission/reception at the network infrastructure. Thus, QoE can be a measure from the end-user's perspective of the overall quality of the service provided, while QoS is generally focused on the media or network itself—not the perspective of the end-user. Examples of QoS parameters may include, but are not limited to, packet loss, bit rate, throughput, transmission delay, availability, jitter, etc.

The IEEE 802.11 family of standards for wireless local area network (WLAN) technology, also referred to as Wi-Fi, typically include QoS extensions that can manage the prioritization of traffic based on the type of data/traffic. For example, QoS extensions for some 802.11 protocols may prioritize the transmission of voice packets and video packets. Particularly, Wi-Fi Multimedia (WMM), previously known as Wireless Multimedia Extensions (WME), is a subset of the 802.11e wireless LAN (WLAN) specification that enhances QoS on a network by prioritizing packets (traffic) according to four access categories (AC). According to WMM, the access categories (arranged from highest priority to lowest) include:

1) Voice: By giving voice packets the highest priority, WMM enables concurrent Voice over IP (VoIP) calls with minimal latency and the highest quality possible;
2) Video: By placing video packets in the second tier, WMM prioritizes it over all other data traffic and enables support for three to four standard definition TV (SDTV) streams or one high definition TV (HDTV) stream on a WLAN;
3) Best effort: Best effort data packets consist of those originating from legacy devices or from applications or devices that lack QoS standards; and
4) Background: Background priority encompasses file downloads, print jobs and other traffic that does not suffer from increased latency.

Each of the aforementioned WMM access categories represents a different WLAN transmit and/or receive (Tx/Rx) policy. WMM also defines how Differentiated Services Code Point (DSCP) values can be mapped into those access categories. For example, when traffic flows (related data packets or a sequence of data packets going from/to a source/destination) go from a wired network to a wireless client, the WMM maps DSCP values to certain access categories (ACs) so that packets which contain different DSCP values, are routed to different transmission queues.

For example, on the uplink (UL) side, an application on a client device may set a DSCP value for its packets, based on the application's specifications. Prior to transmission of a traffic flow from the application (referred to as an application flow), a flow scheduler may use the DSCP value to determine a Traffic ID (TID) that can be assigned to the traffic flow, which the flow scheduler uses to map the data packet and other data packets constituting the traffic flow, to a queue corresponding to one of the ACs. Thus, the packets, being in the different transmission queues, can be transmitted in accordance with different WLAN transmission policies of the ACs.

In a dense Wi-Fi environment, background traffic can lead to channel congestion. Such channel congestion can be made worse by overlapping basic service set (OBSS) interference which can lead to poor end-user QoE. Mere prioritization and scheduling optimization on an AP tends to be insufficient to mitigate the loss of QoE due to channel conditions. Furthermore, other scenarios may arise where clients roam voluntarily, or may be forced to roam by an AP due to a bad association. Thus, clients may associate to a target radio with less-than-ideal or less-preferred capabilities, or may end up "sticking" to their currently-associated radio despite experiencing lower Modulation Coding Scheme (MCS) rates, higher retry rates, etc., which also result in poor end-user QoE.

Moreover, and traditionally, RSSI (an indication of strength with which a radio can hear a client device) has been the sole indicator used for matching a client to a radio (of a network device, such as an AP) using neighbor radio reports. However, reliance on RSSI alone can result in a client getting stuck with increased jitter, packet loss, and low throughput. This can occur even when RSSI is good because characteristics of active traffic flows on a client, client and radio capability, and capacity (e.g., bandwidth) of a target radio to meet traffic flow requirements of the client are not considered in conventional systems and methods. Other considerations, such as client mobility, e.g., whether a client was stationary or had previously roamed from another AP, and the aforementioned OBSS interference, may impact client QoE. Thus, such considerations should be taken into account before deciding on a target radio to which the client is to be steered.

More particularly, and in accordance with examples of the presently disclosed technology, telemetry data from APs is received by a QoE service (also referred to as a flow QoE service). The QoE service can be implemented or executed in a server, such as a cloud server. In particular a QOE service handler module of the QoE service can receive the telemetry data, and then send traffic flow notifications to a QoE computation engine. The QoE computation engine computes a client QoE score for each traffic flow associated with that client. A QoE match engine aggregates performance data for each traffic flow, and arrives at an overall radio availability score for each radio of the APs, which the QoE match engine may then use to identify a list of recommended target radios that are more likely to service the client with better QoE than the radio to which the client is currently associated. Depending on certain considerations, e.g., whether a client has recently been steered to a new radio(s), or if steering is imminent, a QoE match filter can be used to filter the recommended list of target radios to arrive at a subset of the recommended list identifying the most preferred target radios to which clients can be steered. A QoE recommendation builder can then use the subset of the recommended list to create steering recommendations for clients based on whether clients meet certain criteria, e.g., clients that can be matched to a better co-located radio, clients that have associated to radios that are experiencing OBSS interference, etc.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Before describing examples of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. FIG. 1 illustrates an example of a configuration implemented with an organization having multiple users (or at least multiple client devices 110) and at least one physical or geographical site 102. The network configuration 100 may include site 102 in communication with a network 120.

Site 102 may include a primary network, which may be an office network, home network, or other network installation, for example. The primary network may be a private network, such as a network that may include security and access controls to restrict access to authorized users of the private network. Authorized users may include employees of a company at site 102, residents of a house, customers at a business, for example.

In the example of FIG. 1, site 102 includes a controller 104, which is in communication with network 120. The controller 104 may provide communication with the network 120 for site 102. There may be other points of communication with the network 120 for site 102 in addition to controller 104. Although a single controller 104 is illustrated, site 102 may include multiple controllers and/or multiple communication points with network 120. In some examples, controller 104 may communicate with the network 120 through a router. In other examples, the controller 104 provides router functionality to the devices in site 102. In this specification, the word "tunnel" refers to an encapsulated mode of transporting data between AP and controller.

Controller 104 may be operable to configure and manage network devices, such as at site 102. Controller 104 may be operable to configure and/or manage switches, routers, access points, and/or client devices connected to a network. Controller 104 may itself be, or provide the functionality of, an access point (AP).

Controller 104 may be in communication with one or more switches 108 and/or wireless APs 106A-C. Switch 108 and wireless APs 106A-C provide network connectivity to various client devices 110A-J. Using a connection to a switch 108 or AP 106A-C, a client device 110A-J may access network resources, including other devices on the (site 102) network and network 120.

Examples of client devices may include: desktop computers, laptop computers, servers, web servers, authentication servers, authentication-authorization-accounting (AAA) servers, domain name system (DNS) servers, dynamic host configuration protocol (DHCP) servers, internet protocol (IP) servers, virtual private network (VPN)

servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, internet of things (IOT) devices, and the like.

Within site 102, switch 108 is included as one example of a point of access to the network established in site 102 for client devices 1101-J. Client devices 1101-J may connect to switch 108 and through switch 108, may be able to access other devices within the network configuration 100. Client devices 110 I-J may also be able to access network 120 through switch 108. Client devices 110 I-J may communicate with switch 108 over a wired or wireless connection. In the illustrated example, switch 108 communicates with controller 104 over a wired or wireless connection 112E.

Wireless APs 106A-C are included as another example of a point of access to the network established in site 102 for client devices 110A-H. Each of APs 106A-C may be a combination of hardware, software, and/or firmware that is configured to provide wireless network connectivity to wireless client devices 110A-H. In the example of FIG. 1, APs 106A-C can be managed and configured by controller 104. APs 106A-C communicate with the controller 104 and the network 120 over connections 112A-D, which may be either wired or wireless interfaces.

Network 120 may be a public or private network, such as the Internet, or other communication network to allow connectivity among various sites, such as site 102, as well as access to servers 160A-B. Network 120 may include third-party telecommunication lines, such as phone lines, broadcast coaxial cable, fiber optic cables, satellite communications, cellular communications, and the like. Network 120 may include any number of intermediate network devices, such as switches, routers, gateways, servers, and/or controllers, which are not directly part of network configuration 100 but that facilitate communication between the various parts of network configuration 100, and between network configuration 100 and other network-connected entities. Network 120 may include various servers 160A-B. In an example, servers 160A-B may comprise content servers that include various providers of multimedia downloadable and/or streaming content, including audio, video, graphical, and/or text content, or any combination thereof. Examples of content servers 160A-B include web servers, streaming radio and video providers, and cable and satellite television providers. The client devices 110A-H may request and access the multimedia content provided by the content servers 160A-B.

In an example, servers 160A-B may comprise QoE service servers that include various information for provisioning services to client devices 110 A-J, and optimizing client orchestration in accordance with the examples disclosed herein. APs 106A-C, or switch 108 may request or upload information (represented by dashed lines 130A-D, such as telemetry data, for orchestrating client devices 110A-J, e.g., controlling the steering of client devices 110A-J to one or more radios of one or more APs 106A-C. The information may include, but is not limited to, a measure or estimate of QoE on a per traffic flow basis (QoE score); flow characteristics and other QoS measurements, such as but not limited to, jitter, delay, airtime, latency, etc.; analytics; transmission protocols (e.g., OFDMA and MU-MIMO), and the like. The information may be stored in a database, which can be communicatively coupled to the servers 160A, 160B. In some examples, the servers 160A-B may be cloud-based, which would be understood by those of ordinary skill in the art to refer to being, e.g., remotely hosted on a system/servers in a network (rather than being hosted on local servers/computers) and remotely accessible.

Figure 2:
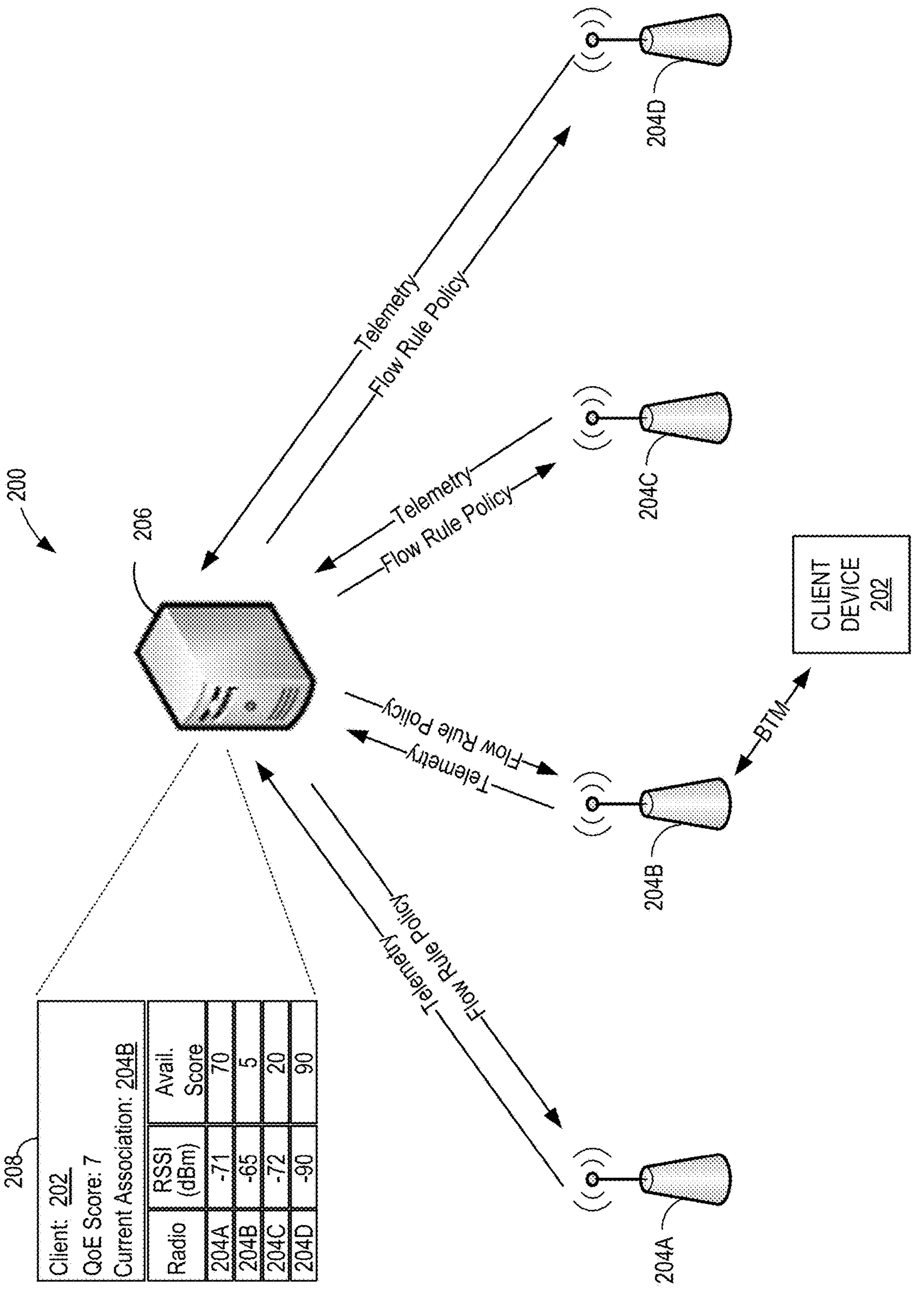
FIG. 2 is a schematic block diagram of a system for orchestrating clients based on QoE, in accordance with examples of the presently disclosed technology.

FIG. 2 is a schematic block diagram of a system 200 for orchestrating traffic flows based on QoE, in accordance with examples disclosed herein. System 200 comprises a server 206 that is communicably coupled to a plurality of network access devices 204A-204D. System 200 also includes a client device 202 configured to access a network (e.g., network 120) via one or more of the plurality of network access devices 204A-204D, which in some examples, may be APs. Server 206 may be an example implementation of one of servers 160*a* or 160*b* implemented as QoE service servers. Client device 202 may be implemented, for example, as any one of client devices 110A-J.

Server 206 may be configured to use telemetry data to derive a measure of QoE that can be used to maintain a state of the network. For example, each network access device 204A-204D can be configured to provide telemetry data to server 206. The current QoE scores may be associated with, e.g., client device 202 and a TID for each traffic flow. The telemetry data may comprise, among other things, QoE scores for traffic flows passing through each network access device 204A-204D. In some examples, each network access device 204A-204D may comprise a flow optimizer module (not shown) that may provide telemetry data to the server 206 by packaging current QoE scores on a per-traffic flow basis for client device 202 as a message to server 206. An example of a flow optimizer module is disclosed in U.S. application Ser. No. 18/646,547, filed on Apr. 25, 2024, and assigned to the present applicant, which is incorporated herein by reference in its entirety.

In some examples, server 206 may generate and maintain a view of the network (e.g., network 120). Server 206 may create a view in the form of one or more instances of table 208, where each instance is representative of the network with respect to a particular client device, e.g., a client view. That is, server 206 may generate and maintain a view representative of an aggregated list of radios that are in the RF neighborhood of a client device (including the radio to which the client device is currently associated), along with RSSI values indicating the perceived signal strength of a client device from a network access device's (AP's) perspective. Server 206 may also generate and maintain a view of the WMM-enabled radios, and their respective availability scores, e.g., a cloud view, as well as a list of client devices, with respective radios to which the client devices are currently associated, and client QoE scores, e.g., an AP view. For example, an AP view can represent relative availability of neighboring and a current AP to which the client device is associated. Neighbor APs refers to those APs whose beacons or transmissions can be heard by the AP under consideration. Such neighboring APs can be determined by way of a neighbor AP list that can be constructed based on an Information Element (IE) report received by the AP, such as a reduced neighbor report in 802.11k. Availability can be represented using colors, numerical scores, such as availability scores, or other mechanisms that can represent AP availability. It should be noted that the state of APs can be dynamically updated with client mobility information, providing a user/customer with a view or perspective regarding which APs can better serve client devices with high priority traffic flows.

In the example of FIG. 2, table 208 is a simplified representation of the network for client device 202. Server 206 may populate the table 208 with a list of network access devices within a communicable reach of the client device 202 (e.g., network access devices that are available to the client device for establishing connections), including any network access devices to which the client device 202 is currently connected. In the example of FIG. 2, network access devices 204A-204D are examples of network access devices available to client device 202 and client device 202 is currently connected to (e.g., associated with) to network access device 204B. For each network access device 204A-204D, the server 206 may determine an availability score (sometimes referred to herein as a radio availability score) from the telemetry data received form each network access device 204A-204D. The server 206 may also determine and populate the table 208 with RSSI measurements between each network access device 204A-204D and client device 202 as measured by the network access devices 204A-204D. Furthermore, server 206 may determine a client QoE score (an aggregate of the QoE scores associated with each of the client device's traffic flows, weighted by the priority of such traffic flows) for each client device, including client device 202 as shown in table 208.

In an example, server 206 may determine availability scores as a function of a number of traffic flows passing through each network access device 204A-204D ranked according to priority and device statistics, such as but not limited to, channel utilization, retry rate, and throughput. In one example, an availability score may be computed as an aggregate of client QoE scores for client devices associated with a particular network access device, along with additional radio level attributes, such as but not limited to, channel utilization, retry rate, and an aggregate throughput on the network access device. This aggregation of QoE scores may, in some examples, be a weighted average of the QoE scores across traffic flows on a particular radio. The weights, in some examples, may be proportional to the priority of the traffic flows, e.g., the weight for a business-critical traffic flow may be higher than that for a low priority traffic flow. FIG. 2 provides some illustrative availability scores computed according to an illustrative example. The numbers depicted in FIG. 2 are not intended to be limiting and are provided as examples to illustrate the examples described herein.

As noted above, the client QoE scores for a particular client device, such as client device 202, may be determined based on QoE scores of traffic flows associated with the client device. In an example, the client QoE score may be computed by aggregating the QoE scores of each traffic flow originating from or destined for the client device 202, weighted by the priority of each traffic flow. In an example, a client QoE score may be computed by weighting an average of the QoE scores of each traffic flow originating from or destined for the client device 202. A higher priority traffic flow (e.g., lower QoE score) may be translated to a higher weight with respect to lower priority traffic flows. In the example of FIG. 2, the client device 202 is shown having a client QoE score of 7, which is provided as an illustrative example.

In operation, after client association (to a radio) and exchange of WMM QoS parameters (described in greater detail below) between a network access device and client device 202, the network access device can decide if the network access device can accommodate the client device 202 using the flow optimizer module of the network access device. For example, the network access device may execute an admission control (ADM CTL) decision based on a determination regarding whether the network access device has enough resources to honor the QoE requirements of traffic flows for the client device. The determination by the network access device may be based on one or more of: static limitation according to hardware and firmware resources of the network access device and dynamic consideration based on the computed QoE score for traffic flows corresponding to the client device. If the client device 202 cannot be accommodated, the network access device may send an ADM CTL notification to the server 206.

If the server 206 receives an ADM CTL notification for a given client device, server 206 may follow steps in a QoE matching algorithm, described below in connection with FIG. 3, to identify one or more suitable target network access devices for the client device. After a suitable target network access device has been identified, server 206 can send a request to the identified network access device to trigger a BTM request to steer the client device to the identified network access device. For example, if network access device 204A determined that it could not accommodate the client device 202, the server 206 may have identified network access device 204B as a suitable target network access device. The server 206 may then send a trigger to network access device 204B to send a BTM request to the client device 202, as shown in FIG. 2. As will also be described in greater detail below, a list of recommended target network access devices for the client device can be accessed, and sent to the network access device, such as network access device 204B. Network access device 204B can decide whether or not to steer client device 202 to one of the recommended target network access devices, more particularly, a target radio. In some examples, an age out feature may be implemented such that up-to-date recommendations of target network access devices can be generated.

If client device 202 can be accommodated, the network access device adds the client device to its traffic flow table (not shown) and allocates resources to traffic flows corresponding to client device 202. Server 206 may continue to receive telemetry data for traffic flows to and from the client device. The telemetry data, may include QoE scores for each traffic flow, as described above. The server 206 may aggregate the per-flow QoE scores to compute the client QoE score by weighting the individual QoE scores with prioritization information for each traffic flow set forth in flow rule policies. As illustrated in FIG. 2, flow rule policies may be received by network access devices 204A-D from server 206. Flow rule policies can be derived or configured based on traffic flows according to TIDs and client devices, and previously measured QoEs (described in greater detail below) for each traffic flow. For example, server 206 may hold an SLA for client device 202 that specifies a criticality of certain applications and, thus, a priority of traffic flows originating from or destined for those applications. That is, the SLA may specify that certain applications originating or destined for traffic flows are critical applications and specify QoS parameter requirements for those traffic flows.

In some examples, a QoE score for a given traffic flow ($QoE_{flow}$) may be computed as follows:

$$QoE_{flow} = QoE_{Max} - QoS_{flow} \quad \text{Eq. 1}$$

where $QoE_{Max}$ represents a normalization factor that may be set on a scale of 1 to 10. In this example, $|QoE_{Max}|=10$. $QoS_{flow}$ represents the QoS for that traffic flow, which can be computed as:

$$QoS_{flow} = \frac{\left(\text{Weight}_{AvgLatency} \times \text{Flow}_{Latency} + \text{Weight}_{Jitter} \times \text{Flow}_{jitter} + \text{Weight}_{PacketLoss} \times PacketLoss\right)}{\left(\text{Weight}_{AvgLatency} + \text{Weight}_{Jitter} + \text{Weight}_{PacketLoss}\right)} \quad \text{Eq. 2}$$

where $\text{Weight}_{AvgLatency}$, $\text{Weight}_{jitter}$, and $\text{Weight}_{PacketLoss}$ are configurable weights that can be set as desired for a particular application.

PacketLoss refers to the number of (unreceived) packets lost during transmission where . . . PacketLoss can be determined as follows:

$$\text{PacketLoss} = (\text{Packet}_{DropCount}) * (\text{Packet Loss Factor}) \quad \text{Eq. 3}$$

where $\text{Packet}_{Dropcount}$ refers to the number of packets that were dropped/not delivered to a target, and where Packet Loss Factor refers to a normalization factor used to convert the number of dropped packets to a score between 1 and 10.

$\text{Flow}_{Latency}$ can refer to an average of the last N packet latencies for Tx ($\text{Tx}_{Latency}$ for DL) and Rx ($\text{Rx}_{Latency}$ for UL) traffic flows, respectively. $\text{Flow}_{Latency}$ and $\text{Flow}_{jitter}$ can be computed as follows:

$$\text{Flow}_{Latency} = (\text{Max}_{AvgLatency}) * (\text{Latency Factor}) \quad \text{Eq. 4}$$

$$\text{Flow}_{jitter} = (\text{Jitter}_{Cumulative} + \text{Jitter}_{Peak}) * (\text{Jitter Factor}) \quad \text{Eq. 5}$$

The Latency Factor is used to convert actual latency values to a score between 1 and 10. Minimum and maximum latency (5 and 100 ms, respectively, specifies the range used for normalization). $\text{Max}_{AvgLatency}$ and $\text{Min}_{AvgLatency}$ can refer to calculated latency values based on actual measurements and then normalized to a score between 1 and 10 based on the specified range (set forth by the minimum/maximum latencies). Latency cumulatively increases per a base latency factor (latency factor for a latency of 10 ms) which is a function of minimum and maximum latency. The effect of latency is non-linear, and this is characterized by the latency factor. Regarding $\text{Flow}_{Latency}$, average latencies (equation 8) corresponding to 10, 20, 40, 60 and 80 ms, are calculated by equation 4. The Latency factor for each of the average latencies in equation 8 is derived based on the specified range, which is 5-100, and is calculated as discussed herein. The Jitter Factor is also used to convert actual jitter values to a score between 1 and 10 per a base jitter factor (jitter factor for a jitter of 2 ms), which is a function of minimum and maximum jitter. Constant values used to normalize the latency and jitter values can vary depending on actual characterizations of different category of applications.

$$\text{Jitter}_{Cumulative} = \sum_{n=1}^{n=m} (\text{Max}_{AvgLatencyM} - \text{Min}_{AvgLatency}) \quad \text{Eq. 6}$$

$$\text{Jitter}_{Peak} = (\text{Max}_{AvgLatency} - \text{Min}_{AvgLatency}) \quad \text{Eq. 7}$$

$$\text{Max}_{AvgLatency} = \text{Max}(AvgLatency1, AvgLatency2, \ldots AvgLatencyM) \quad \text{Eq. 8}$$

$$\text{Min}_{AvgLatency} = \text{Min}(AvgLatency1, AvgLatency2, \ldots AvgLatencyM) \quad \text{Eq. 9}$$

As alluded to above, total transmission latency ($\text{Tx}_{Latency}$) and total reception latency ($\text{Rx}_{Latency}$) can be computed as follows:

$$Tx_{Latency} = Tx_{tDatapath} - Tx_{tCompletion} \quad \text{Eq. 8}$$

$$Rx_{Latency} = Rx_{tTrigger} - Rx_{tPacket} \quad \text{Eq. 9}$$

$\text{TX}_{tDatapath}$ refers to a timestamp of a packet when it arrives in the WiFi datapath, and TXtCompletion refers to a timestamp of when the packet is successfully transmitted over the air (and received by the client device), based on TX completion signalizing per the WiFi Media Access Control (MAC) layer, $\text{RX}_{tTrigger}$ refers to the timestamp of the Uplink OFDMA triggers sent out to client devices soliciting trigger-based uplink transmissions from the client devices. $\text{RX}_{tPacket}$ refers to timestamps associated with Rx packets received in response to the uplink triggers sent by the AP to the client devices.

If the client QoE falls below a threshold QoE value, the server 206 may execute a QoE matching algorithm (described in greater detail below) to identify one or more network access devices more suited to service the client device. The server 206 may then supply this recommendation to the associated network access device, which may then decide whether or not to steer the client device 202 to the identified target network access device.

When client device 202 receives a BTM request to steer to an identified network access device, the client device 202 can accept or reject the request. If the client device 202 accepts the BTM request and transitions traffic flows to the identified target network access device, the client device may send a BTM response with a reason code, ACCEPT to the associated network access device. If the client device 202 rejects the request and does not transition, the client device may send a reason code, REJECT. In the example of FIG. 2, client device 202 may receive a BTM request from network access device 204B requesting the client device 202 steer to an identified network access device (e.g., one of network access devices 204A, 204C, or 204D) and client device 202 may respond with a BTM response as set forth above. If the client device 202 does not respond within a defined time period, the BTM request may be timed out.

Upon receiving a BTM response including a code of ACCEPT, the network access device to which the client device 202 is to be transitioned can update its flow table and flow rule policies. The server 206 may update the availability score of the network access devices dynamically to consider the QoS parameter requirements of all the traffic flows to or from the client device 202 now transitioned to the new network access device. Similarly, the availability score of the previous network access device can be updated to reflect that the client device 202 has been moved away from it and that resources are now available for other traffic flows.

While the above description is made with reference to transition a client device 202 from one network access device to another, examples herein may be applied on a per-traffic flow basis. That is, for example, one skilled in the art would understand that BTM requests may be used to identify one or more traffic flows corresponding to client device 202 for transitioning to another network access device using similar operations.

Figure 3:
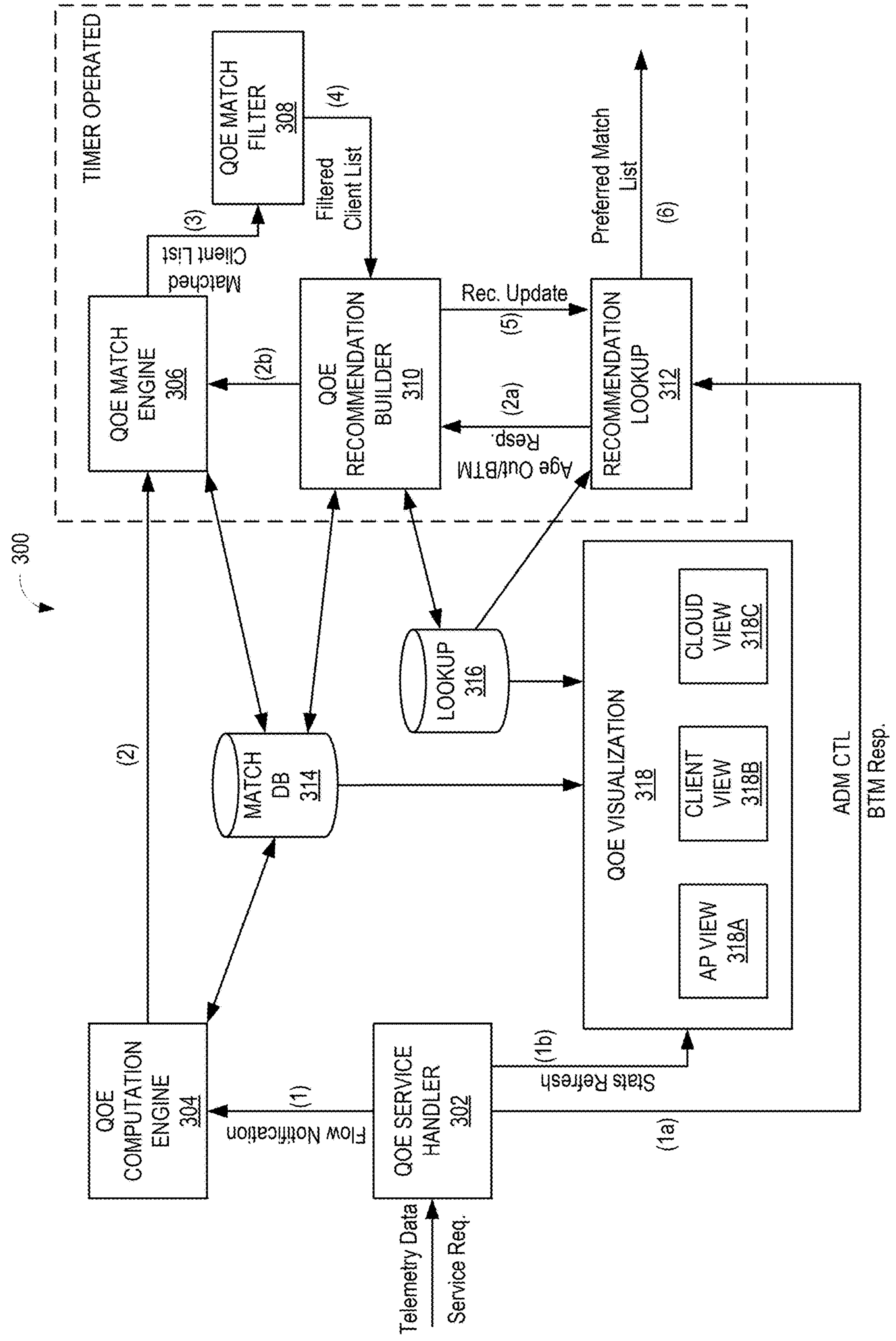
FIG. 3 is a schematic block diagram of an example architecture of a client orchestration system, in accordance with examples of the presently disclosed technology.

FIG. 3 illustrates an example architecture of a QoE service 300 in accordance with the presently disclosed technology. QoE service 300 may be implemented in one of servers 160A/B of FIG. 1 for example.

As discussed above, in addition to QoE service handler module, e.g., QoE service handler 302, receiving telemetry data, QoE service handler 302 may receive service requests.

That is, after a client device associates to a radio of a network access device, such as an AP, and exchanges WMM QoS parameters with the network access device, the network access device can decide if it can accommodate the client device. For example, the network access device may decide, based on a determination regarding whether the network access device has enough resources to accommodate the client device, that it cannot accommodate the client device. The network access device may then send an ADM CTL notification to QoE service handler 302 indicating this inability to accommodate the client device.

Upon receipt of the ADM CTL notification, QoE service 300 can proceed with performing a recommendation lookup (operation1a), i.e., obtaining a preferred match list generated by recommendation lookup module 312. Recommendation lookup module 312 can comprise a query or other similar mechanism that can access lookup table 316 to identify an appropriate AP radio recommendation. The ADM CTL notification can refer to a service request from an AP to the QoE service 300 to provide a preferred radio recommendation for a client. This can occur, e.g., when an existing recommendation has aged out or if there is no recommendation sent by QoE service 300. A BTM response can refer to a service request sent from the AP to QoE service 300 relaying the BTM response that the AP received from the client. The relayed BTM response can be used by QoE service 300 to update lookup table 316. If the preferred match list provided by recommendation lookup module 312 has not yet been aged out, the preferred match list can be sent to the currently associated radio (operation 6). Receipt of the preferred match list may trigger a service request, in this case, a BTM request, such as that described previously, to steer the client device from its currently associated radio to a target radio selected from the preferred match list. If, however, the preferred match list is no longer current/valid, and has aged out (at 2*a*), QoE recommendation builder 310 can send a request (operation 2*b*) to QoE match engine 306. QoE match engine 306 can generate a new matched client list (radio-client matches) (operation 3) for the client device. The new matched client list can be filtered by QoE match filter 308 (operation 4), which may then be forwarded to QoE recommendation builder 310. In turn, QoE recommendation builder 310 can forward a recommendation update (operation 5) to recommendation lookup module 312. Recommendation lookup module 312 can then send a preferred match list corresponding to the recommendation update to the radio to which the client device is currently associated. As will be explained in detail below, the QoE matching aspect of the presently disclosed technology relates a client device to preferred radios. The recommendation aspect of the presently disclosed technology further processes the match results by determining which client devices of the determined radio-client matches should be steered.

If the client device can be accommodated, QoE service handler 302 will continue to receive QoE telemetry data for the flows of the client device. Two types of messages may be received by QoE service handler 302, e.g., telemetry data which will be used in QoE computations (identified on the flow), and service requests sent by the AP (e.g., the ADM CTL and BTM response). QoE computation engine 304 can then receive flow notifications (operation 1) from QoE service handler 302. QOE computation engine 304 may then aggregate the per-flow telemetry values (telemetry data) received from a network access device to compute the client QoE score by weighting individual QoE scores of the flows with their respective priorities. If the client QOE score falls below a given threshold, QoE computation engine 304 may send a request to QoE match engine 306 to identify target radios (of network access devices) that are more likely to service the client better than the currently associated radio (operation 2). A client-radio match list/matched client list comprising the identified target radios and their corresponding client can be used to update match database 314. The matched client list can be sent to QoE match filter 308 to be filtered (operation 3). Filtering criteria can include whether or not a client device has been recently steered or if steering of the client device is imminent. That is, in some examples, client devices that have been recently steered to a target radio can be excluded from the filtered (matched) client list, whereas client devices that are to be steered soon may be included in the filtered (matched) client list to facilitate the impending steering. QoE match filter 308 may then send a filtered (matched) client list to QoE recommendation builder 310 (operation 4) including those clients that, e.g., have not been recently (recentness being a definable criterion) steered or those clients for whom steering is imminent. QoE recommendation builder 310 may further process the filtered (matched) client list by recommending a subset of clients that match certain criteria, such as clients associated to radios that have OBSS interference, clients for which QoE service 300 has received an ADM CTL request, etc. In other words, although a plurality of client-radio matches may be determined or identified, steering certain client devices may be more warranted, such as steering clients who have roamed to non-preferred radio, or whose associated radio is experiencing OBSS interference. Focusing on such a subset of clients allows for better convergence. In some examples, convergence can refer to arriving at an actionable list of recommendations (a subset of the match results/matched client list), steering clients when a recommended radio would result in improving the QoE of the clients, and eliminating bouncing back/forth or back/forth steering of clients from one AP to another AP.

This recommendation can take the form of a preferred match list, which can be stored at lookup cache 316. Recommendation lookup module 312 can access lookup cache 316 to obtain the preferred match list, which it can then forward to the network access device of the radio to which the client is currently connected. A flow optimizer module (not shown) in the network access device may then, based on the preferred match list, determine whether or not to proceed with steering the client to a recommended target radio (operation 6). The flow optimizer module can take into account a client device's request for priority treatment of certain traffic flows, and associate such prioritized traffic flow with a priority tag which can be programmed to a transmission queue. Examples of priority tags are a latency sensitive application (LSA) tag, a voice (VO) application tag, a high throughput (HT) application tag, etc.

As noted above, when a client device receives a BTM request to steer to a target radio, the client device can accept or reject the request by sending a BTM response indicating acceptance or rejection with an appropriate code. If the client device does accept the BTM request, it may move to the target radio, and send its ACCEPT response code to its previously associated radio. If a client device does not provide a response, the request will time out. The network access device's flow optimizer can subscribe to these events and forward any related information to the QoE service 300. Upon a client device moving, new QoE computations can be performed on the network access device and within QoE service 300 reflecting the updated QoE for the target radio.

As discussed above, QOE recommendation builder 310 can be used to further refine/filter the filtered (matched)

client list to focus on certain clients devices for which steering is more warranted/more important at a given time. Accordingly, QoE recommendation builder 310 can build recommendations for a subset of client devices that meet the following criteria: client devices that have received an ADM CTL notification; client devices that can be matched to a better co-located radio; client devices that have associated to radios that are experiencing OBSS interference; client devices that have roamed to a non-preferred radio; client devices that have been steered to a preferred radio, but are experiencing "bad" or below-threshold QoE; client devices with active priority traffic flows whose QoE is consistently decreasing, but is associated to a preferred radio with a higher QoE; client devices whose QoE has fallen below the QoE threshold for a given period of time; QOE stability on a preferred radio which refers to the QoE score always remaining within a "good" range, and not jumping in/out of that good range so as not to act until it is known/verified by stable QoE scores that QoE is experiencing a downward trend; client devices whose recent steering history indicates either that steering has been enabled/disabled (as noted above, repeated bouncing of a client device between APs is undesirable, and thus steering can be enabled/disabled as desired).

The recommendation/preferred match list can be used either for immediate remedial action, or for proactively steering client devices to maintain "good" or desirable QoE in a network. That is, the flow optimizer of an AP/network access device need not immediately steer a client device upon receipt of the preferred match list. In other scenarios, the recommendation/preferred match list may be used to provide insights for the non-steering of client devices and local actions on a currently associated AP/network access device for improving QoE. More particularly, the flow optimizer can select client devices for steering based on the following hierarchically ordered client device characteristics or criteria: (1) client devices with non-prioritized, high throughput traffic flows affecting radio QoE (described below with respect to FIG. 4); (2) client devices with non-prioritized latency sensitive traffic flows affecting radio QoE; (3) client devices with prioritized high throughput traffic flows sorted in a least recently steered order; (4) client devices with prioritized latency sensitive traffic flows sorted in a least recently steered order.

To implement the age out feature, each recommendation/preferred match list has a time to live (TTL) attribute configured therein. That is, each recommendation/preferred match list carries the TTL for each client, which a network access device/AP can use to steer a client device prior to TTL expiration by sending an ADM CTL request to QoE service 300.

In some examples, as noted above, a view of a network (e.g., network 120 of FIG. 1) may be generated and maintained by QoE service 300. As illustrated in FIG. 3, QoE visualization module 318 may receive or obtain radio-client match information from match database 314, cached recommendations/preferred match lists from lookup cache 316 to generate and maintain an AP/network access device view 318A, a client view 318B, and a cloud view 318C. QoE visualization module 318 may also receive a "stats refresh" (operation 1*b*), which can refer to QoE, loss, latency, and jitter telemetry updates to QoE visualization module 318. Again, as an example, an AP view can present information or visuals regarding the availability of neighboring and a current AP to which a client device is associated, wherein the AP view can be dynamically updated with client mobility information.

It should be noted that in order to preserve processing resources, QoE service 300 may be configured to execute or perform the above-described operations on a non-continuous basis. That is, in some examples, a timer or similar timing mechanism can be used to periodically turn QoS service 300 on or off. The timer can be configured to operate in a periodic manner such that QoE service 300 is not constantly running, and can be triggered based on various events, e.g., a recent steering event, a recent recommendation lookup, etc.

Figure 4:
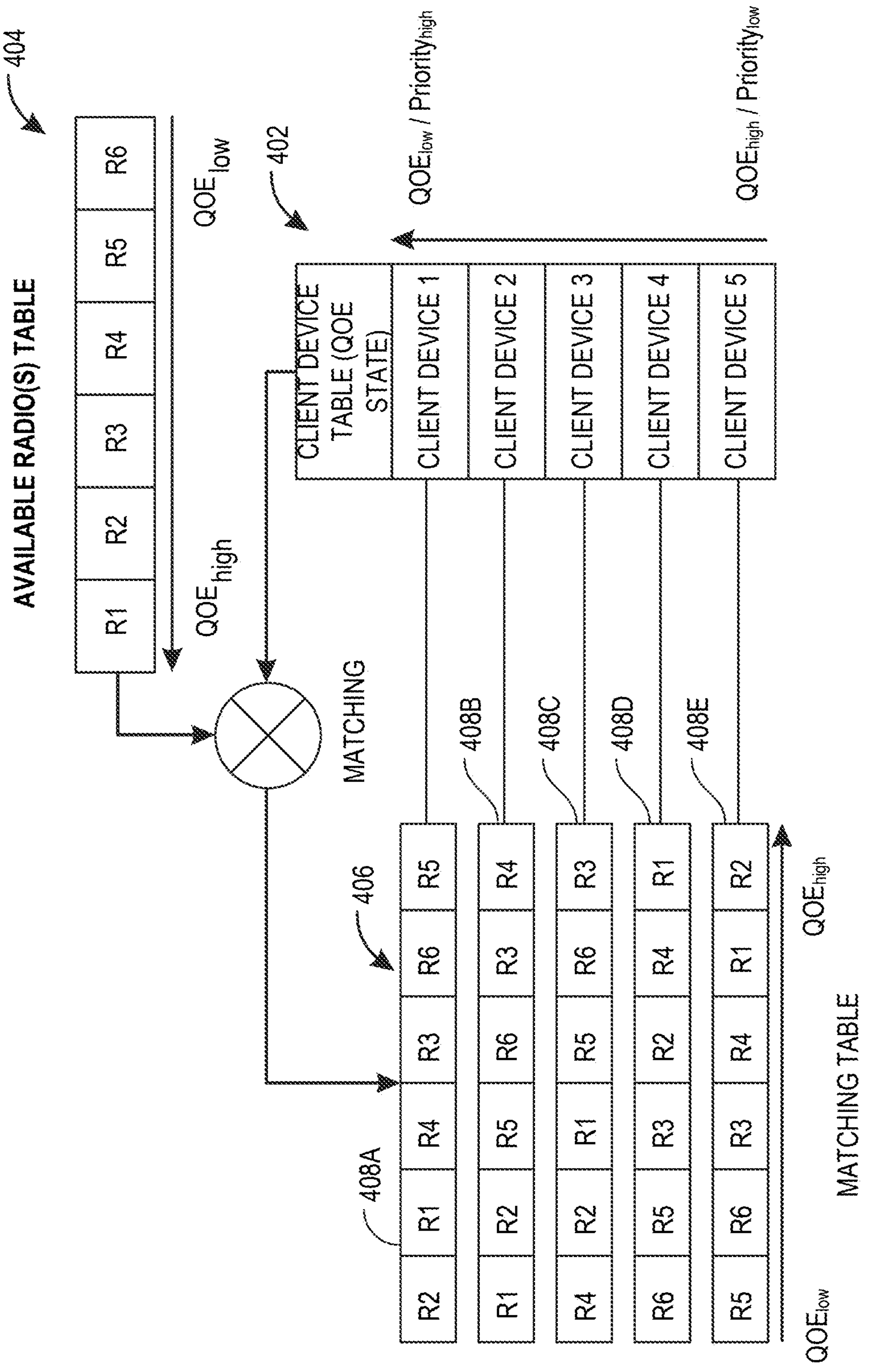
FIG. 4 is a schematic block diagram of an example QoE matching algorithm, in accordance with examples of the presently disclosed technology.

FIG. 4 is a schematic block diagram of an example QoE matching algorithm in accordance with examples disclosed herein. The QoE matching algorithm comprises a client device table 402 and a network access device table 404, both of which can be used to generate a table 406 of candidate network access devices for each client device listed in the client device table 402. The QoE matching algorithm computes a preference score for each network access device in the network access device table 404 with respect to each client device in the client device table 402, and sorts the network access device in order from highest preference score to lowest preference score for each client device in table 406. The higher the preference score for a given network access device with respect to a given client device, the more suitable the network access device is for handling traffic flows of the client device. Said another way, a higher preference score corresponds to a higher QoE provided by the network access device for that client device.

The QoE matching algorithm executes each time any of the following conditions or events occurs. The QoE matching algorithm can run each time the aforementioned timer expires. The QoE matching algorithm can run when the recommendation update (operation 5 of FIG. 3) figures out that the recommendations have aged out. In some examples, aging out can be thought of as an attribute of the generated recommendation, where an age out value can be specified or configured as desired/as appropriate for a particular system/network. The value can be a time period configured in terms of, e.g., milliseconds or seconds, where once that time (since the recommendation was generated) has elapsed, the recommendation is deemed no longer usable. When recommendations have aged out, available QoE is reclaimed because the client devices recommended to be steered where not steered. Additionally, the QoE matching algorithm can run when the client QoE changes due to traffic flow deletions driving the available QoE higher than if it was previously "gated" by an ADM CTL notification. Further still, the QoE matching algorithm can run when an ADM CTL notification is received. Receipt of an ADM CTL notification indicates resource constraints exist on a radio or after a client device is steered to a preferred radio, and the QoE may then be updated.

In the example of FIG. 4, the client device table 402 comprises a plurality of client devices, illustratively shown as client device 1 through client device 5. Each client device may be implemented as one of client device 110 *a-j*, 140*a-d*, 150*a-b*, 402 and/or 502. The client devices may be listed or ranked in an order from lowest client QoE score to highest client QoE score, where a client QoE score is computed as described above. A lower client QoE score may indicate a higher priority or need for addressing QoE because the end-user of the particular client device may be experiencing lower QoE.

In the example of FIG. 4, the available radio(s) table 404 comprises a plurality of radios (of network access devices) communicatively available to the client devices listed in client device table 402. The radios are illustratively provided as R1 through R6. The radios may be provided in an ordered list from highest radio QoE score to lowest radio QoE score. A radio QoE score can be computed based on all traffic flows flowing though the radio. That is, the radio's QoE score may be computed in a manner similar to the client QoE score, except from the viewpoint of the radio. A higher radio QoE score indicates the radio is able to offer higher QoE to associated client devices.

In examples disclosed herein, for each client device, the QoE matching algorithm computes a preference score (also be referred to as a QoE match score) for a radio currently associated with the client device, and any neighboring radios (e.g., the radios contained in available radio(s) table 404). The preference score for a given radio can be a function of an availability score for that radio, as described above in connection with FIG. 2; a capability match score between the radio and the client device (e.g., match between IEEE 802.11 standard compatibility); channel capacity metrics like a channel utilization score; the number of high throughput and latency-sensitive flows on the radio (e.g., an active flows score); and an RSSI with which the radio reads signals from the client device (e.g., in the form of an RSSI impact score). It should be noted that the manner in which scores are assigned or designated to the aforementioned factors is known to those of ordinary skill in the art, and can vary.

For example, a radio preference score can be a function of the following factors set forth in Table 1.

TABLE 1

| Attribute | Consideration for the QOE Match |
|---|---|
| QOE | Preferred radio on the neighbor APs which is highly ranked by QOE |
| RSSI | RSSI on the preferred radio should be greater than the RSSI Threshold |
| Bandwidth (BW) | BW on the preferred radio should be greater than or equal to the current BW |
| Spatial Streams (SS) | Number of Spatial streams enabled on the preferred radio |
| Utilization | Channel utilization of the of the preferred radio |
| TPUT flows | Number of high throughput flows active on the preferred radio |
| LSA flows | Number of latency sensitive flows active on the preferred radio |

In some examples, the higher the availability score, the higher the preference score. Additionally, a match in capability may translate to a higher preference score. Capabilities can be static, like high efficiency (HE) or extremely high throughput (EHT) capabilities, or dynamic, like channel bandwidth and the number of spatial streams. If a client is EHT-capable and there are two candidate radios, one EHT-capable and the other non-EHT-capable, the preference score will be higher for the EHT-capable radio. If there are two candidate radios for a client, and one of them is operating on a higher bandwidth than the other, it will have a higher preference score than the other radio. If there are multiple candidate radios for a client, radios with lower channel utilization will be preferred over those with high channel utilization. If there are multiple candidate radios for a client, radios with a lower number of high throughput and latency sensitive flows will be preferred over those with a higher number of such business-critical flows.

A larger absolute RSSI value can also mean a higher preference score. In various examples, RSSI values can be negative, thus examples herein may convert RSSI to a positive value by applying the following transformation: RSSI impact on preference score=105−(−1)*RSSI. The preference scores can be normalized to a positive value between 0 and 100.

Accordingly, a radio's preference score can be computed as follows. Radio preference score=($w_1$*radio availability score+$w_2$*capability match score+$w_3$*channel utilization score+$w_4$*active flows score+$w_5$*RSSI impact score)/($w_1$+$w_2$+$w_3$+$w_4$+$w_5$). The values of weights $w_1$−$w_5$ can increase/decrease the impact of a particular factor or attribute to the overall radio preference score. Such weight values can be determined or configured offline, and can be adaptive based on learned weight values associated with these factors. It should be noted that because the formula/algorithm for determining a radio preference score considers all the above-noted attributes, it is unlikely that a target radio will be selected that does not have sufficient resources. It is also unlikely that a target radio will be selected that has available resources and matches capabilities with a client device, but is far away from the client device, reflected via a low client RSSI.

Using the preference scores, the matching algorithm generates ordered lists 408A-408E of radios sorted from highest preference score (e.g., highest QoE matching score) to lowest preference score (e.g., lowest QoE matching score) for each client device 1 through 5 in client device table 402. The ordered lists 408A-408E for each client device 1 through 5 can be combined to form table 406. In the example of FIG. 4, the ordered list 408A can be determined for client device 1 and comprises radio R5, radio R6, radio R3, radio R4, radio R1, and radio R2, in that order. Similarly, ordered lists 408B-408E can be generated for client devices 2 through 5, respectively, each comprising a different order of radio.

Respective ordered lists of table 406 can be supplied to radios associated with each client device as a candidate list of radios for transitioning client devices for improving QoE. For example, if client device 1 is currently associated with radio R3, the matching algorithm may provide ordered list 408A to radio R3. Radio R3 may then determine whether or not to request client device 1 to transition to a higher ranked radio (e.g., radio R5 or R4). In examples, such requests can be performed using BTM messages, as described above. Thus, client device 1 can transition to radio R5 for improved QoE. As another example, if client device 1 is current associated with radio R5, the ordered list 408A may indicate that a more suitable radio is not available and client device 1 may remain associated with the radio R5. Similar operations can be performed for each client device using a respective ordered list.

As noted above, client device steering based on radio-client matches (and subsequent recommendations) that have been determined accordance with the presently disclosed technology can be used to segregate or de-prioritize non-critical application traffic (e.g., background traffic) from critical application traffic (e.g., voice traffic), as well as for load balancing critical traffic flows depending on existing channel conditions. More particularly, the QOE service, e.g., QoE service 300, can monitor: QOE score; a radio's channel utilization; the number of active high priority flows and active low latency flows; airtime; throughput; retries; and MCS rates on network access devices/APs in a network. When non-prioritized flows on APs are affecting the QOE of business-critical flows, the QOE service can match and recommend a lower ranked radio for servicing the offending flows.

Furthermore, the QOE service can sub-rank the APs sharing a channel, and then match the priority traffic to the highest-ranked AP in availability order. When the flows are steered to the lower ranked co-channel radios, the AP can shape the flows by reducing the airtime and MCS so as to bring down the level/amount of contention on the channel from a lower ranked AP, thereby increasing the channel efficiency. That is, a highest ranked AP should provide the highest QOE for its associated client devices as per the SLAs and business criticality.

The QOE service can also tag the radios that may be co-located on the same AP, which can be used for providing recommendations, e.g., a client device may be associated to a 2.4 GHz radio of a particular AP, when a 6 GHz radio could be available on the same AP. The QOE service can monitor link time on MLO radios for high priority flows on APs, and recommend a better TID-to-link map configuration or another preferred AP. When the jitter causing a bad QOE for a latency sensitive flow is the result of channel contention, the AP can send an ADM CTL notification to the QOE service, and the QOE service can recommend a preferred radio of the AP to which the client can be steered. In some instances, jitter can persist even after a client device gets steered to a preferred radio with a high QOE score, e.g., in case of voice flows and SSH sessions. In such instances, the QOE service can provide insights to the AP regarding subsequent actions that the AP can take to address persistent jitter. Such actions can include limiting the MCS and aggressive retries to reduce the jitter by improving the QOE. When high throughput flows and latency sensitive flows share the same AC, an AP can request the QOE service to steer the high throughput flows to a preferred radio based on their priority. In this way, higher QoE can be maintained for the active flows on the AP. When a client device roams to an AP and gets stuck on a radio with a good RSSI, but which is not a good QOE match, the client device can be steered to a preferred radio based on the recommendation from the QOE service. When a flow prioritization is requested by MSCS or an SCS client on a radio which is resource constrained, the flow optimizer on the AP can accept the request from the client instead of sending it a rejection. The flow optimizer can send an ADM CTL notification to the QOE service requesting a preferred radio recommendation, and then steer the client to the preferred radio. In this way, the QOE of client devices can be centrally managed in a coordinated fashion, rather than having the client device identify another AP iteratively or work with a sub-optimal QOE.

Figure 5:
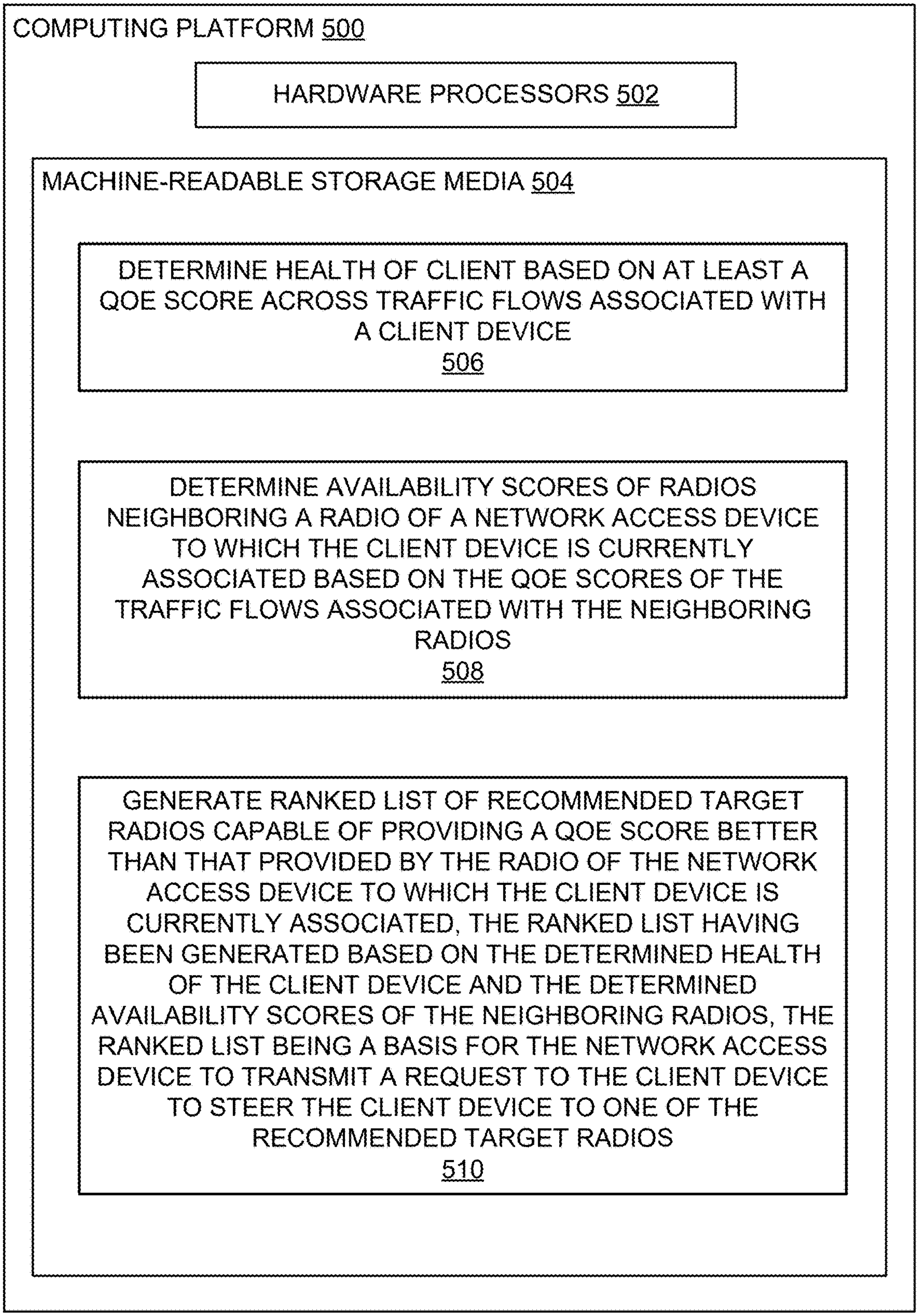
FIG. 5 is an example computing component that may be used to implement various features of client orchestration in accordance with an example of the presently disclosed technology.

FIG. 5 illustrates an example computing component that may be used to implement various features of client orchestration in accordance with an example of the presently disclosed technology. Referring now to FIG. 5, computing component 500 may be, for example, a server computer, a controller, or any other similar computing component capable of processing data. In the example implementation of FIG. 5, the computing component 500 includes a hardware processor 502, and machine-readable storage medium for 504. In an example, computing component 500 may be included in a server, such as one of servers 160A-B as described herein.

Hardware processor 502 may be one or more central processing units (CPUs), semiconductor-based microprocessors, and/or other hardware devices suitable for retrieval and execution of instructions stored in machine-readable storage medium 504. Hardware processor 502 may fetch, decode, and execute instructions, such as instructions 506-510, to control processes or operations for client orchestration. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-510.

Hardware processor 502 may execute instruction 506 to determine the health of a client device based on at least a quality of experience (QoE) score across traffic flows associated with the client device. As described above, a QoE service handler of a QoE service can receive telemetry data for traffic flows to and from the client device. The telemetry data may include QoE scores for each traffic flow, the QoE service may aggregate the per-flow QoE scores to compute the client QoE score by weighting the individual QoE scores with prioritization information for each traffic flow set forth in flow rule policies.

Hardware processor 502 may execute instruction 508 to determine the availability scores of radios neighboring a radio of a network access device to which the client device is currently associated based on the QoE scores of the traffic flows associated with the neighboring radios. Availability scores, as discussed above, can be a function of a number of traffic flows passing through each network access device ranked according to priority and device statistics, e.g., channel utilization, retry rate, and throughput.

Hardware processor 502 may execute instruction 510 to generate a ranked list of recommended target radios capable of providing a QOE score better than that provided by the radio of the network access device to which the client device is currently associated. In some examples, the ranked list was generated based on the determined health of the client device and the determined availability scores of the neighboring radios. The ranked list is a basis for the network access device to transmit a request to the client device to steer the client device to one of the recommended target radios. Using the client QoE score for each traffic flow associated with the client device, and the radio availability score for the radio of the network access device, the QoE service identifies available radios and ranks the available radios according to a preference score. The preference score can be determined based on the radio availability score, radio and client capability match, one or more channel capacity metrics, the number of business-critical flows on the radio, and the RSSI with which the radio hears the client device. Depending on certain considerations, e.g., whether a client has recently been steered to a new radio(s), or if steering is imminent, the recommended list of target radios can be filtered to arrive at a subset of the radio list identifying the most preferred target radios to which clients can be steered. A QoE recommendation builder can then use the subset of the radio list to create steering recommendations for clients based on whether clients meet certain criteria, e.g., clients that can be matched to a better co-located radio, clients that have associated to radios that are experiencing OBSS interference, etc.

Figure 6:
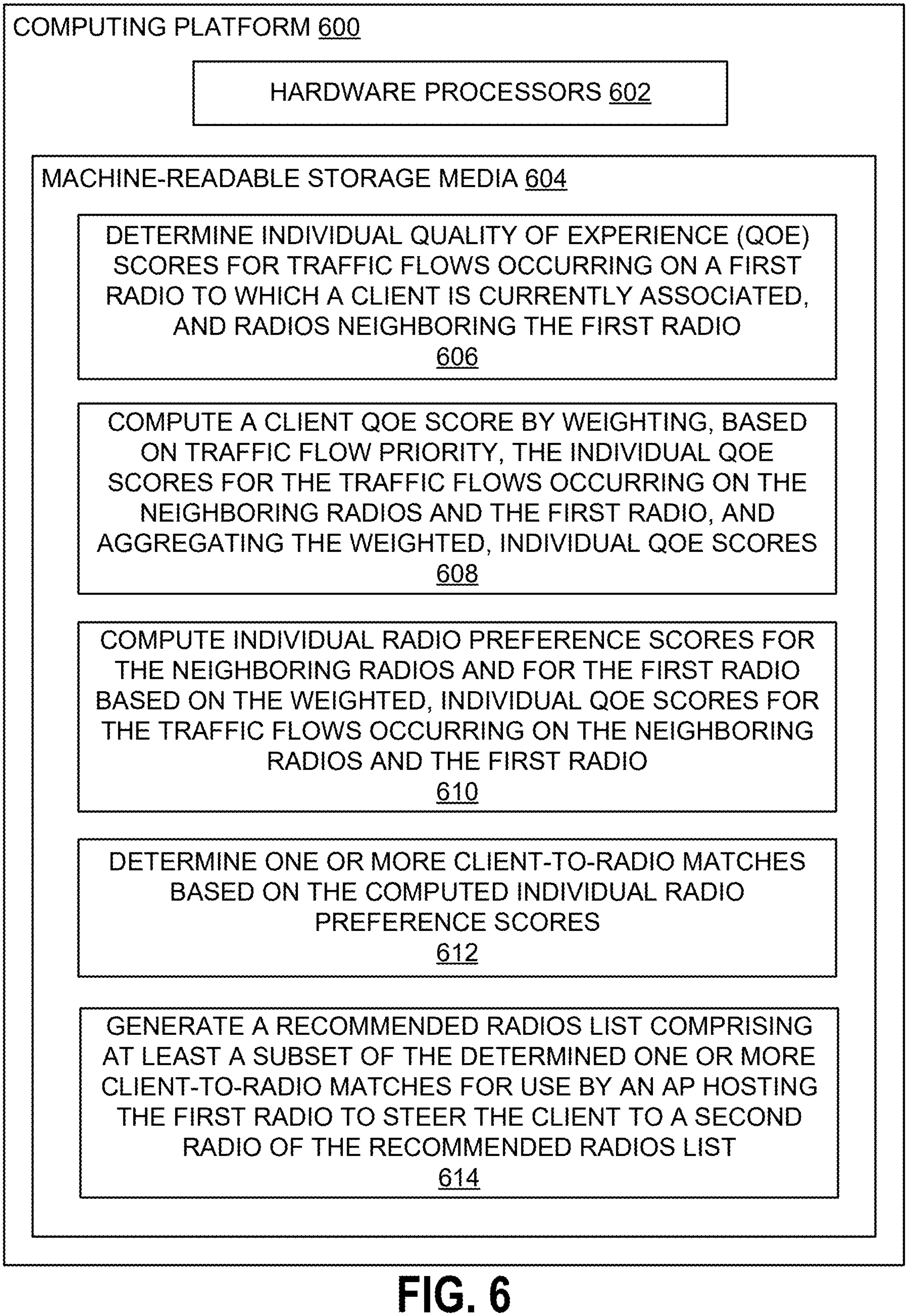
FIG. 6 is an example computing component that may be used to implement various features of client orchestration in accordance with another example of the presently disclosed technology.

FIG. 6 illustrates an example computing component that may be used to implement various features of client orchestration in accordance with an example of the presently disclosed technology. Referring now to FIG. 6, computing component 600 may be, for example, a server computer, a controller, or any other similar computing component capable of processing data. In the example implementation of FIG. 6, the computing component 600 includes a hardware processor 602, and machine-readable storage medium for 604. In an example, computing component 600 may be included in a server, such as one of servers 160A-B as described herein.

Hardware processor 602 may be one or more central processing units (CPUs), semiconductor-based microprocessors, and/or other hardware devices suitable for retrieval and execution of instructions stored in machine-readable storage medium 604. Hardware processor 602 may fetch, decode, and execute instructions, such as instructions 606-614, to control processes or operations for QoE based transition optimization. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-614.

Hardware processor 602 may execute instruction 606 to determine individual quality of experience (QoE) scores for traffic flows occurring on a first radio to which a client is currently associated, and radios neighboring the first radio. As discussed above, a QoE service may receive telemetry data from a network access device. The telemetry data may include QoE scores for traffic flows passing through each network access device, e.g., telemetry data can be provided to by packaging current QoE scores on a per-traffic flow basis for the client device.

Hardware processor 602 may execute instruction 608 to compute a client QoE score by weighting, based on traffic flow priority, the individual QoE scores for the traffic flows occurring on the neighboring radios and the first radio, and aggregating the weighted, individual QoE scores.

Hardware processor 602 may execute instruction 610 to compute individual radio preference scores for the neighboring radios and for the first radio based on the weighted, individual QoE scores for the traffic flows occurring on the neighboring radios and the first radio.

Hardware processor 602 may execute instruction 612 to determine one or more client-to-radio matches based on the computed individual radio preference scores. Using the client QoE score, and a radio availability score for the radio of the network access device, available radios can be identified and ranked according to a preference score. The preference score can be determined based on the radio availability score, radio and client capability match, one or more channel capacity metrics, the number of business-critical flows on the radio, and the RSSI with which the radio hears the client device Hardware processor 602 may execute instruction 614 to generate a recommended radios list comprising at least a subset of the determined one or more client-to-radio matches for use by an AP hosting the first radio to steer the client to a second radio of the recommended radios list. Again, depending on certain considerations, e.g., whether a client has recently been steered to a new radio(s), or if steering is imminent, the recommended radio list (of target radios) can be filtered to arrive at a subset of the available, ranked radios identifying the most preferred target radios to which clients can be steered. The subset of the recommended radio list can then be used to create steering recommendations for clients based on whether clients meet certain criteria, e.g., clients that can be matched to a better co-located radio, clients that have associated to radios that are experiencing OBSS interference, etc.

Figure 7:
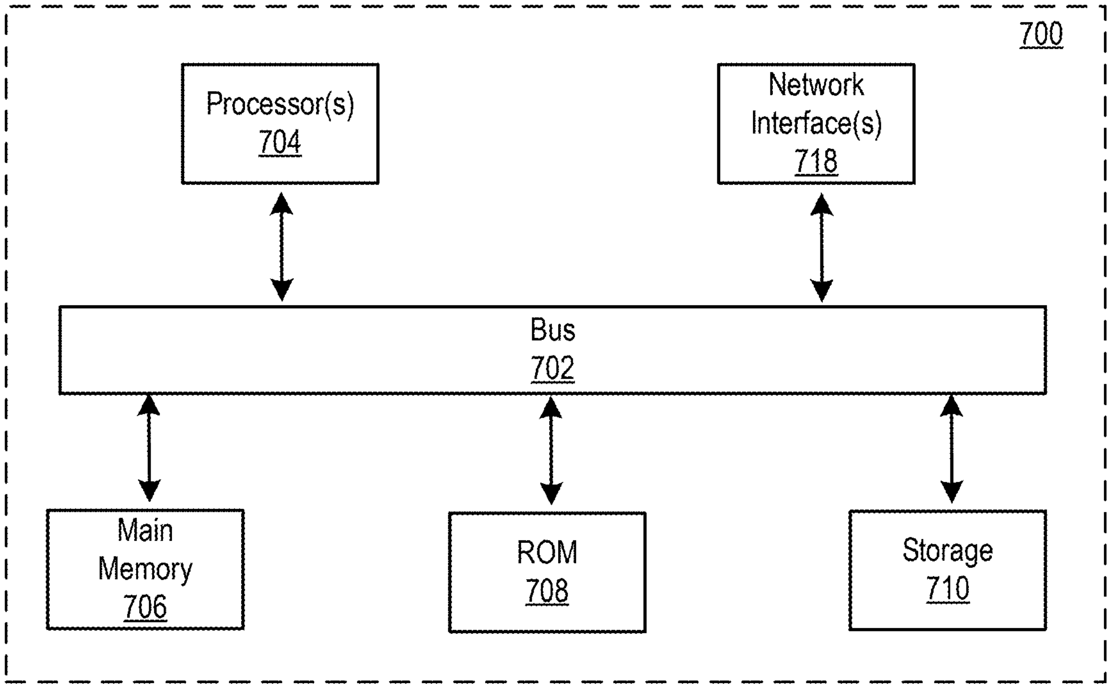
FIG. 7 is an example computer system that may be used to implement various features of QoE-based client mobility in accordance with examples of the presently disclosed technology.

FIG. 7 depicts a block diagram of an example computer system 700 in which various of the examples described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors. The computer system 700 may be implemented as one or more of the components described in connection with FIG. 1 (e.g., client devices 110A-J; APs/network access devices 106A-C; controller 104; and servers 160A-B); network access devices 204A-D of FIG. 2.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions. Examples herein may store instructions in main memory 706 that, when executed by processor 704, perform the functions and operations described in connection with FIGS. 2-6.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one example, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a network interface 718 (also sometimes referred to as a communication interface) coupled to bus 702. Network interface 718 provides a two-way data communication coupling to one or more network links that are connected to one or more local networks. For example, network interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information. The network interface 718 may comprise or be considered a radio component of the computer system 700 for interfacing with remote devices.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system comprising:

a processor; and a memory comprising machine-readable instructions that when executed, cause the processor to:

determine health of a client device based on at least a quality of experience (QoE) score across traffic flows associated with the client device;

determine availability scores of radios neighboring a radio of a network access device to which the client device is currently associated based on the QoE scores of the traffic flows associated with the neighboring radios;

generate a ranked list of recommended target radios capable of providing a QOE score better than that provided by the radio of the network access device to which the client device is currently associated, the ranked list having been generated based on the determined health of the client device and the determined availability scores of the neighboring radios, the ranked list being a basis for the network access device to transmit a request to the client device to steer the client device to one of the recommended target radios.

2. The system of claim 1, wherein the instructions that when executed cause the processor to determine the health of the client, comprise instructions that when executed, further cause the processor to receive telemetry data associated with traffic flows to and from the client device.

3. The system of claim 2, wherein the telemetry data comprises QoE scores for each of the traffic flows to and from the client device.

4. The system of claim 3, wherein the instructions that when executed cause the processor to determine the health of the client, comprise instructions that when executed, further cause the processor to aggregate the QoE scores for each of the traffic flows.

5. The system of claim 3, wherein the instructions that when executed cause the processor to determine the health of the client, comprise instructions that when executed, further cause the processor to weight the QoE scores for each of the traffic flows with prioritization information for each of the traffic flows in accordance with flow rule policies.

6. The system of claim 5, wherein weights used to weight the QoE scores are proportional to priorities associated with each of the traffic flows set forth in the prioritization information.

7. The system of claim 5, wherein the instructions that when executed cause the processor to determine availability scores, comprise instructions that when executed, further cause the processor to determine radio level attributes of the radios neighboring the radio of the network access device to which the client device is currently associated in addition to the aggregated QoE scores for each of the traffic flows.

8. The system of claim 6, wherein the radio level attributes comprise at least one of channel utilization, data transmission retry rate, and throughput associated with each of the neighboring radios.

9. The system of claim 1, wherein the instructions that when executed cause the processor to generate the ranked list of recommended target radios, comprise instructions that when executed, further cause the processor to identify available radios and rank the available radios according to a preference score using the QoE score for the client device and the availability score for the radio of the network access device to which the client device is currently associated.

10. The system of claim 9, wherein the instructions that further cause the processor to identify available radios and rank the available radios according to a preference score, comprise instructions that when executed, further cause the processor to determine the preference score based on the availability scores of the neighboring radios, radio and client device capability match, one or more channel capacity metrics, a number of business-critical flows on the radio to which the client device is currently associated, and a received signal strength identifier value with which the radio to which the client device is currently associated hears the client device.

11. The system of claim 1, comprising instructions that when executed, further cause the processor to filter the ranked list of recommended target radios to identify one or more most preferred target radios to which the client device can be steered.

12. The system of claim 11, wherein the filtering is based on whether the client device has been recently steered to one or more new radios.

13. The system of claim 11, wherein the filtering is based on whether steering of the client device is imminent.

14. A system comprising:

a processor; and a memory comprising machine-readable instructions that when executed, cause the processor to:

determine individual quality of experience (QoE) scores for traffic flows occurring on a first radio to which a client is currently associated, and radios neighboring the first radio;

compute a client QoE score by weighting, based on traffic flow priority, the individual QoE scores for the traffic flows occurring on the neighboring radios and the first radio, and aggregating the weighted, individual QoE scores;

compute individual radio preference scores for the neighboring radios and for the first radio based on the weighted, individual QoE scores for the traffic flows occurring on the neighboring radios and the first radio;

determine one or more client-to-radio matches based on the computed individual radio preference scores;

generate a recommended radios list comprising at least a subset of the determined one or more client-to-radio matches for use by an AP hosting the first radio to steer the client to a second radio of the recommended radios list.

15. The system of claim 14, wherein the memory comprises further machine-readable instructions that when executed, cause the processor to receive telemetry data associated with the traffic flows occurring on the first radio, the telemetry data including the individual QoE scores.

16. The system of claim 14, wherein the instructions that when executed cause the processor to perform the weighting, comprises further instructions that when executed, further cause the processor to weight the QoE scores for the traffic flows with prioritization information for each of the traffic flows in accordance with flow rule policies.

17. The system of claim 14, wherein the weighting is based on weights that are proportional to priorities associated with the traffic flows set forth in the prioritization information.

18. The system of claim 14, wherein the instructions that when executed, cause the processor to compute individual radio preference scores, comprise instructions that when executed further cause the processor to compute the individual radio preference scores based on availability scores of individual radios, radio-client capability matches, one or more channel capacity metrics, a number of business-critical flows on an individual radio, and a received signal strength with which individual radios hear the client.

19. The system of claim 14, wherein the instructions that when executed, cause the processor to generate a recommended radios list comprising at least a subset of the determined one or more client-to-radio matches, further comprise instructions that when executed, further cause the processor to filter an initial recommended radios list to derive the subset of the determined one or more client-to-radio matches.

20. The system of claim 19, wherein the filtering is based on whether the client has been recently steered to one or more new radios or whether steering of the client is imminent.

* * * * *